US012756753B2

(12) United States Patent
Schrum

(10) Patent No.: US 12,756,753 B2
(45) Date of Patent: Oct. 6, 2026

(54) DATABASE CLUSTER MANAGEMENT

(71) Applicant: Oracle International Corporation, Redwood Shores, CA (US)

(72) Inventor: Allan George Schrum, Wilsall, MT (US)

(73) Assignee: Oracle International Corporation, Redwood Shores, CA (US)

( * ) Notice: Subject to any disclaimer, the term of this patent is extended or adjusted under 35 U.S.C. 154(b) by 117 days.

(21) Appl. No.: 18/819,089

(22) Filed: Aug. 29, 2024

(65) Prior Publication Data

US 2026/0067357 A1 Mar. 5, 2026

(51) Int. Cl.

*H04L 67/104* (2022.01)
*G06F 11/20* (2006.01)
*G06F 16/27* (2019.01)
*G06F 16/28* (2019.01)

(52) U.S. Cl.

CPC ...... *H04L 67/1048* (2013.01); *G06F 11/2023* (2013.01); *G06F 16/27* (2019.01); *G06F 16/285* (2019.01)

(58) Field of Classification Search

CPC .. H04L 67/1048; G06F 11/2023; G06F 16/27; G06F 16/285

See application file for complete search history.

(56) References Cited

U.S. PATENT DOCUMENTS

| | | | | |
|---|---|---|---|---|
| 11,409,771 | B1 * | 8/2022 | Goyal | G06F 16/285 |
| 12,265,860 | B1 * | 4/2025 | Dorfman | G06F 9/5083 |
| 2007/0174660 | A1 * | 7/2007 | Peddada | H04L 67/1027 714/4.1 |
| 2007/0229026 | A1 * | 10/2007 | Morioka | H02J 7/663 320/112 |
| 2012/0190325 | A1 * | 7/2012 | Abu-Hakima | H04L 12/1895 455/404.2 |
| 2015/0347239 | A1 * | 12/2015 | Chan | G06F 16/00 707/652 |
| 2021/0157777 | A1 * | 5/2021 | Yang | G06F 16/1748 |
| 2023/0048514 | A1 * | 2/2023 | Wu | G06F 3/0625 |
| 2023/0392580 | A1 * | 12/2023 | Frederic | F03D 7/028 |
| 2023/0394064 | A1 * | 12/2023 | Chipman | G06F 16/27 |
| 2024/0118905 | A1 * | 4/2024 | Kondiles | G06F 9/442 |
| 2024/0340832 | A1 * | 10/2024 | Tamura | H04W 48/18 |
| 2025/0335467 | A1 * | 10/2025 | Hicks | G06F 16/275 |

* cited by examiner

*Primary Examiner* — Richard G Keehn

(74) *Attorney, Agent, or Firm* — Invoke

(57) ABSTRACT

Techniques for managing a database cluster are disclosed. A database cluster stores a database in a distributed manner among multiple nodes. Applications query a node in the database cluster with a database language query to access data in the database. If the node determines it is in a pre-shutdown state, the node returns both query results and a status indicator. Based on receiving the indication of the pre-shutdown status, the application may continue to query the node to obtain data from the database for an ongoing task or operation. The application may then switch over to another node in the database cluster prior to the node changing to an inaccessible or shutdown state.

20 Claims, 4 Drawing Sheets

DATABASE CLUSTER MANAGEMENT

TECHNICAL FIELD

The present disclosure relates to databases maintained in a database cluster. In particular, the present disclosure relates to query-based management of access to nodes in a database cluster.

BACKGROUND

Database clusters provide redundancy and continuity for applications that access a database. Database clusters distribute a database across multiple nodes in the cluster. Each node includes its own set of processors and hard disk. Nodes in the cluster may operate independently to process queries and transactions. In addition, the nodes may store independent (e.g., replicated) copies of the database. Applications accessing a database stored in a database cluster are directed to one of the nodes to perform transactions. In some systems, one of the nodes in the cluster is designated as a master node. The master node receives queries and directs queries to nodes in the cluster. The master node may provide the API for the cluster that is used to manage the nodes in the cluster. If a node in a database cluster is taken offline due to regularly-scheduled operations or due to an emergency, applications sending queries to the node may continue to send query requests to the offline node, resulting in operational failures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
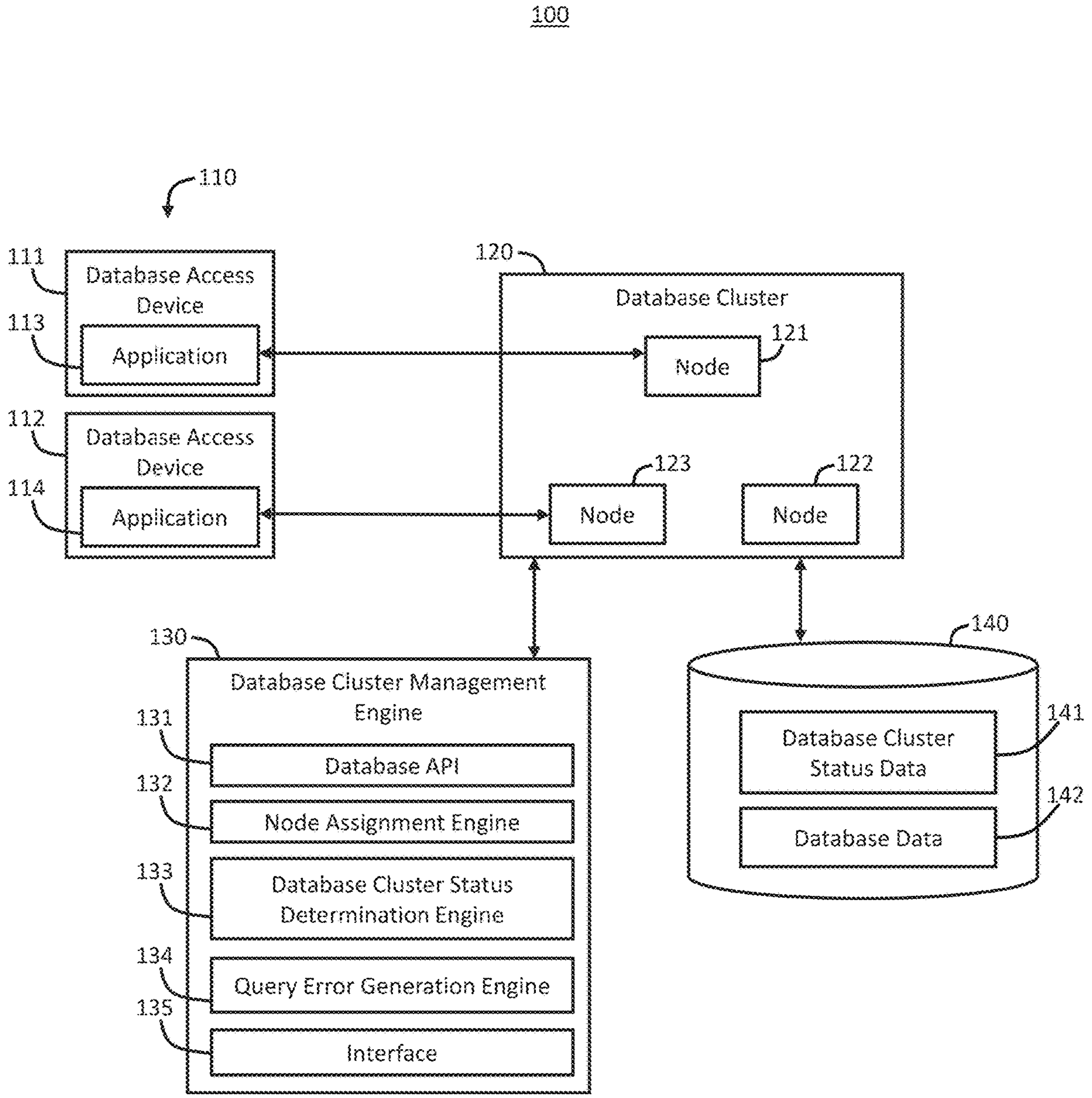
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. DATABASE CLUSTER MANAGEMENT ARCHITECTURE

3. DATABASE CLUSTER SWITCHOVER MANAGEMENT
4. EXAMPLE EMBODIMENT
5. COMPUTER NETWORKS AND CLOUD NETWORKS
6. HARDWARE OVERVIEW
7. MISCELLANEOUS; EXTENSIONS

1. General Overview

One or more embodiments manage a database cluster to reduce downtime to applications accessing the database stored in the database cluster. A database cluster stores a database in a distributed manner among multiple nodes. The nodes may be database servers. The database servers may each store a replicated copy of the same database. Applications query a node in the database cluster with a database language query, such as a standard query language (SQL), to access data in the database. If the node determines it is in a "pre-shutdown" state, the node returns both query results and a status indicator. The pre-shutdown status corresponds to a state where the a shutdown is imminent, pending, or scheduled, but has not yet been initiated. Based on receiving the indication of the pre-shutdown status, the application may continue to query the node to obtain data from the database for an ongoing task or operation. The application may then switch over to another node in the database cluster prior to the node changing to an inaccessible or shutdown state.

In one or more embodiments, nodes in a database cluster store both database data and metadata indicating the status of nodes in the database cluster. Database data includes data that are used by applications to execute operations. Database cluster node status indicators fall into at least three categories: operational, pre-shutdown, and inaccessible (or shutdown). A node in an operational state receives queries and returns query responses. In the operational state, a node is not scheduled to be shut down or placed in an inaccessible state within a predefined timeframe, such as five minutes or ten minutes. In an inaccessible or shutdown state, a node does not receive queries or return query responses. An inaccessible node may be a node that is being backed up, having corrupted data restored, or may be removed from the database cluster to be replaced with another node. A system may use various terms to describe an operational, pre-shutdown, and inaccessible status, such as "up," "down," and "draining," respectively. The "draining" status may indicate to an application that the node will soon be inaccessible (i.e., "down.") The term "draining" refers to the node notifying applications of the imminent shutdown state to allow the applications to switch from querying the node to querying another node in the database cluster, thereby draining the node of client applications. In response to a database language query, a node executes the query on the database and returns a query response and a value representing the status of the node. The value representing the status of the node may be pre-shutdown status, representing a status of the node during a defined period of time prior to changing to an "inaccessible" status.

One or more embodiments trigger a node status change to the pre-shutdown node status by detecting certain node conditions. For example, a system may detect data storage and/or communication errors associated with the node exceeding a threshold. Alternatively, the system may determine the node is due for regularly scheduled backup, replacement, or updating that will require the node be taken offline. According to yet another embodiment, a user may modify the node status in a table stored in the database.

One or more embodiments transmit additional node information to an application in response to the query. For example, a node may transmit (a) a query response, (b) a node status value representing a pre-shutdown status prior to changing to an inaccessible status, and (c) an identifier of another node in the database cluster. The application may re-route query requests from the node with the pre-shutdown node status to the other node in the database cluster. In embodiments, the pre-shutdown status informs an application executing a sequence of queries on the database cluster that the node being accessed by the application is scheduled to be inaccessible within a defined period of time. The notification allows the application to finish the sequence of queries and switch to querying another node in the database cluster prior to the initial node entering an inaccessible state.

One or more embodiments described in this Specification and/or recited in the claims may not be included in this General Overview section.

2. Database Cluster Management Architecture

FIG. 1 illustrates a system 100 in accordance with one or more embodiments. As illustrated in FIG. 1, system 100 includes database access devices 110, a database cluster 120, and a database cluster management engine 130. The database cluster includes nodes 121, 122, and 123. While FIG. 1 illustrates a data repository 140 separate from the nodes 121, 122, and 123, the database cluster status data 142 and the database data 142 are stored in the nodes 121, 122, and 123. In addition, while the database cluster management engine 130 is illustrated separate from the database cluster 120, the database API 131, the node assignment engine 132, the database cluster status determination engine 133, and the query error generation engine 134 may be included in one or more of the nodes 121, 122, and 123. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, database cluster management engine 130 refers to hardware and/or software configured to perform operations described herein for monitoring node status of nodes in a database cluster and notifying querying applications of a pre-shutdown node status. Examples of operations for managing database cluster switchover are described below with reference to FIG. 2.

A database cluster 120 stores a database in a distributed manner among nodes 121, 122, and 123. In FIG. 1, the database data 142 are illustrated separately from the nodes for purposes of illustration. However, two or more of the nodes 121, 122, and 123 store replicated database data 142. In one example embodiment, one node 121 is a manager node and two nodes 122 and 123 are worker nodes. The manager node presents a database application programming interface (API) 131 to applications 113 and 114 accessing the database cluster 120. The manager node includes a node assignment engine 132 to assign traffic from an application 113 or 114 to one or more of the nodes 121, 122, or 123 in the database cluster 120. In one embodiment, once an application is assigned to a node in the database cluster 120, subsequent queries to the database cluster 120 are transmitted directly from the applications 113 or 114 to the assigned node 122 or 123 without passing through the manager node. The assignment of an application to a particular node in the database cluster 120 may be maintained (a) until an application or node severs the assignment, or (b) until the end of a session.

The node assignment engine 132 determines the nodes to assign to applications 113 and 114 based on factors including a current load of nodes, a predicted load of nodes, an application type, and a node status.

In one embodiment, the manager node 121 does not store a copy of a database while the worker nodes 122 and 123 do store copies of the database. In an alternative embodiment, each of the nodes 121, 122, and 123 stores a copy of a database. The nodes 121, 122, and 123 may be synchronized to store the same database data 142 in each of the nodes 121, 122, and 123. According to yet another embodiment, the database cluster management engine 130 is a device external to the nodes 121, 122, and 123 that directs traffic to the nodes 121, 122, and 123. While an example is described above in which node 121 is the manager node, in one or more embodiments, any of nodes 121, 122, and 123 may concurrently be manager nodes capable of directing traffic received at the node to other nodes in the database cluster 120.

A database cluster status determination engine 133 determines a status of nodes in a database cluster. The database cluster status determination engine 133 may be stored, and run, on one or more of the nodes 121, 122, and 123. The database cluster status determination engine 133 may store a node status in database cluster status data 141. In one embodiment, the data repository 140 is a database and the database cluster status data 141 is stored in a table in the database 140. For example, the database data 142 may include a set of tables storing data to be accessed by applications 113 and 114. The database cluster status data 141 may include an additional table that stores metadata associated with the database cluster 120 including a node status for the nodes 121, 122, and 123.

In one embodiment, the database cluster status determination engine 133 includes a database cluster monitor to monitor transmissions to and from the database cluster 120. The database cluster monitor may detect a node status change condition that triggers the database cluster status determination engine 133 changing the node status for a node from an operational status. The operational status may be characterized as a status where (a) a node receives and responds to queries from applications and (b) a node status change to a non-operational status is not imminent. In one or more embodiments, an imminent status change is where the system determines a status change will occur at a future time that is within a defined threshold, such as within five minutes, within ten minutes, or another defined duration of time. A node status change condition that triggers the database cluster status determination engine 133 changing the node status for a node from an operational status may include, for example, detecting a number of error messages generated by a node in response to queries that exceeds a threshold, detecting a data transmission deterioration in a node, detecting corrupted data stored in a node, and detecting a change of a value representing the node's status in the database cluster status data 141. For example, an administrator may decide to replace a database server corresponding to the node 121. The administrator may access the database cluster status data 141 via the interface 135 of the database cluster management engine 130 to change the status of the node from a "green" status, representing an operational status, to a "yellow" status, representing an imminent change of the node to a non-operation status.

In one or more embodiments, the database cluster status determination engine 133 determines whether a node status trigger requires an immediate change from an operational state to an inaccessible state, or whether to transition to an interim state prior to making a node inaccessible. For example, the database cluster management engine 130 may detect a particular type of data corruption that may be spread to other nodes in the database cluster 120. Accordingly, the database cluster management engine 130 may determine that a node 121 should be shut down immediately, without placing the node 121 in an interim state in which applications would be permitted to continue to query the node 121. Alternatively, the database cluster status determination engine 133 may determine that a node status trigger does not require an immediate change to an inaccessible state. For example, the trigger may be a regularly scheduled update, a node replacement at a future time, or a number of query errors exceeding a threshold that does not require an immediate shutdown. Accordingly, the database cluster status determination engine 133 may place the node 121 in an interim "pre-shutdown" status. In the pre-shutdown status, the node 121 continues to receive queries from applications 113 and 114 for a defined duration of time. During the pre-shutdown state, the node 121 notifies querying applications 113 and 114 of the imminent shutdown. At the end of the defined duration of time, the database cluster status determination engine 133 changes the status of the node 121 from "pre-shutdown" to "inaccessible." In an inaccessible state, the node 121 does not receive queries or respond to queries from any applications.

A query error generation engine 134 generates errors and warnings in response to queries. The query error generation engine 134 may be implemented by the nodes 121, 122, and 123. In other words, the respective nodes 121, 122, and 123 may include query error generation engines that generate errors and warnings in response to queries. Errors and warnings may include, for example, an error number, a message string including diagnostic information, and a value representing a severity of the error or warning. In one or more embodiments, when a node determines its state is a pre-shutdown state, the query error generation engine 134 generates a warning including a value representing the pre-shutdown state. The node transmits the warning to the application in response to the query. In one or more embodiments, the query error generation engine 134 transmits a warning with a query response when a node is in a pre-shutdown state and an error in response to a query when the node is in the inaccessible state. The error indicates that the node is not available to receive queries. The query error generation engine 134 may refrain from sending any warning, error, or other message indicating a node is in an operational state (i.e., not in a pre-shutdown state or inaccessible state) in response to queries to database data from applications.

In one or more embodiments, a tenant (such as database access device 111 and/or database access device 112) is a corporation, organization, enterprise or other entity that accesses a shared computing resource, such as the database cluster 120. In an embodiment database access device 111 and/or database access device 112 are independent from each other. A business or operation of database access device 111 is separate from a business or operation of database access device 112.

Additional embodiments and/or examples relating to computer networks are described below in Section 5, titled "Computer Networks and Cloud Networks."

In an embodiment, the database cluster management engine 130 is implemented on one or more digital devices. The term "digital device" generally refers to any hardware device that includes a processor. A digital device may refer to a physical device executing an application or a virtual machine. Examples of digital devices include a computer, a server, a web server, a network policy server, a proxy server, a hardware router, a hardware switch, a hardware firewall, a hardware network address translator (NAT), a hardware load balancer, a mainframe, a router, a switch, a controller, an access point, and/or a client device.

In one or more embodiments, interface 135 refers to hardware and/or software configured to facilitate communications between a user and a database cluster management engine 130. Interface 135 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 135 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 135 is specified in one or more other languages, such as Java, C, or C++.

3. Database Cluster Switchover Management

Figure 2:
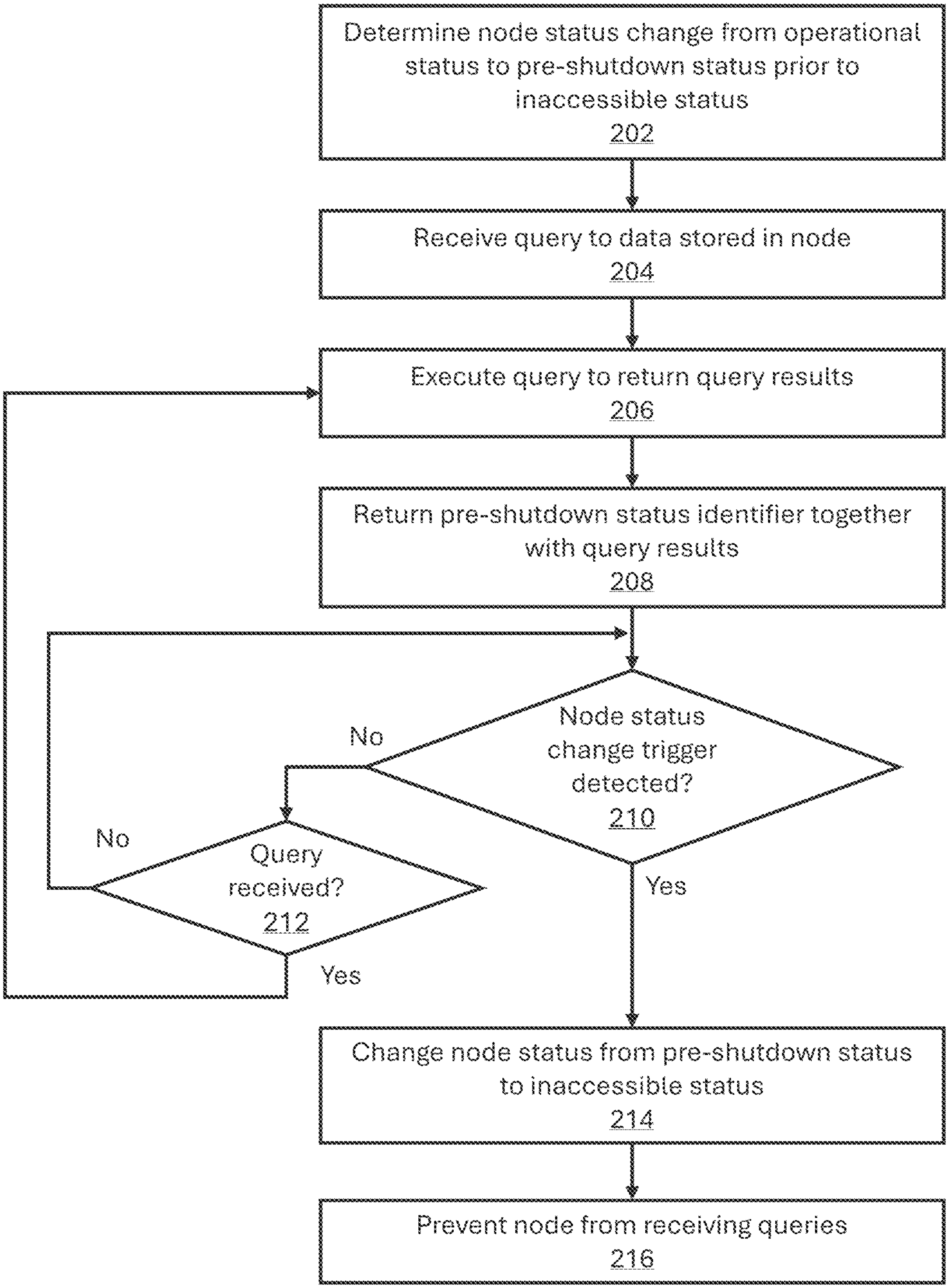
FIG. 2 illustrates an example set of operations for managing a switchover in a database cluster in accordance with one or more embodiments.

FIG. 2 illustrates an example set of operations for managing transactions to and from a database cluster in event of a switchover in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system determines a node status change from an operational status to a pre-shutdown status (Operation 202). The pre-shutdown status may be a temporary status prior to transitioning to an inaccessible status. The system may maintain the node in the pre-shutdown status until a shutdown trigger or condition is detected. The shutdown trigger may correspond to the passage of a predetermined period of time. Alternatively, the shutdown trigger may correspond to determining a particular shutdown condition is met. For example, a system may detect an initial status change of a database cluster node from an "up" status identifier to a "draining" status identifier. The "draining" status identifier may correspond to a status where the database node initiates operations to reduce the number of applications that access the node, thereby reducing errors and faults when the node changes to an inaccessible status. When the system detects the shutdown condition, the node transitions from the pre-shutdown state to an inaccessible state. For example, a status identifier associated with the node may change from "draining" to "down."

In one or more embodiments, the system determines the initial node status change from the operational status (e.g., "on") to the pre-shutdown status (e.g., "draining") based on detecting a first node status change trigger. The first node status change trigger may be based on detecting pre-shutdown condition. For example, a system may detect a number and/or frequency of errors that exceeds a threshold. A node may generate an error based on receiving a query to access data in the node and determining the node cannot execute the query. The node may determine that data has become corrupted based on detecting the node crashing, node performance slowing, data in the node that is de-synchronized with other nodes in the database cluster, where the desynchronization is not based on valid database transactions, requested data are not at a location specified in a query or request, and applications reporting an inability to open files retrieved from the database. According to one example, a database node performs a periodic self-check to detect file-level corruption, such as operating system file errors, file access issues, errors, and warnings, file corruption, and disk-related issues, errors, and warnings. The system may determine that detected issues, such as corrupted files, cannot be repaired or corrected. According to one example, the pre-shutdown condition includes the determination that the faults and/or errors exist in the node.

According to another example, a pre-shutdown condition is based on a scheduled node downtime. For example, a system may schedule an update to the node, a backup of the node to another node in the cluster, or from another node in the cluster to the node, a diagnostics check of the node, or another modification to the node requiring the node be disconnected from external applications and/or devices.

According to another example, the pre-shutdown condition is based on a user input. For example, a system manager may modify a stored state of the node in a table specifying the states of the nodes in the database cluster.

In one or more embodiments, the system determines whether to change a node's status directly from an operational state to the inaccessible state, or whether to change the node's status to a pre-shutdown state prior to changing to the inaccessible state. The system may determine that the node's state should transition directly from an operational state to an inaccessible state based on determining immediate shutdown criteria are met. For example, the system may detect data corruption or activity in a node that may affect the integrity of other nodes in a database cluster. The system may receive an administrator input to take a node offline immediately. The system may analyze traffic patterns to determine that no applications are presently accessing the node, whereas traffic is expected at a later time. If the system determines that the criteria are not met for an immediate node shutdown, the system may place the node in the pre-shutdown state to allow applications querying the node to complete pending operations prior to switching to another node in the database cluster.

In one or more embodiments, the node transitions from the pre-shutdown state to the inaccessible state based on a second node status change trigger. The second node status change trigger may be the passage of a defined period of time. For example, the system may maintain the node in the pre-shutdown state for five minutes. When five minutes has elapsed, the node may transition to the inaccessible state. In another embodiment, the second node status change trigger is based on applications accessing the data in the node. For example, the system may identify a number of high priority applications and a number of low priority applications that access the node. The second node status change trigger may include determining the high priority applications accessed the node while the node was in the pre-shutdown state and received a notification that the node was in the pre-shutdown state. The second node status change trigger may include a combination of a time element and an application identification element. For example, the system may determine that the second node status change trigger is met when (a) three high priority applications accessed the node while the node was in the pre-shutdown state, and (b) two of the three high priority applications have not accessed the node within the previous five minutes, indicating the three high priority applications have switched over to an alternate node.

In one or more embodiments, the system stores the node's pre-shutdown status identifier in a data table in the database. The data table stores metadata describing the database cluster and the states of nodes in the database cluster. For example, if a database cluster includes three nodes, the data table may store identifiers "up," "interim," and "up" in fields for storing the node status for the three nodes. According to one example, a system stores an identifier for an alternative node in the metadata. The alternative node may be a node where an application may redirect queries to avoid downtime. For example, a first node in a database cluster may be a manager node. An application may interact with the manager node to access data in the database. The system may modify the status of the first node from "up" to "draining." The system may also identify a second node in the database cluster as "alternative manager node."

The node receives a query to access data stored in the node (Operation 204). The query may be a Structured Query Language (SQL) query, or a query in a database language. The query includes elements specifying, for example, a table stored in the database, a portion of a table (such as a column), filters to apply to results, groupings to apply to results, and an order for returning results.

The node executes the query to return a set of results (Operation 206). For example, a database cluster includes multiple nodes, each storing a replicated copy of a database. An application transmits a query to a node that executes the operations specified in the SQL query to identify a set of records stored in the database that match the query terms.

The node returns its status identifier together with the query results (Operation 208). In one example, a node stores both database data in a first set of database tables and database cluster metadata in a second table. An application transmits a query to the node to access data stored in the database tables. The query may not be directed to data stored in any metadata table that stores the status information for nodes in the database cluster. The node returns a set of results based on the data stored in the database tables. The node returns query results to the application and appends the node status data indicating the node's interim status to the query results. For example, the node may return a set of results based on the query and a warning message or notification stating the node is in a pre-shutdown state, such as a "draining" state. The "draining" state informs the querying application that the node will soon be in an inaccessible state and the application should soon direct queries to another node in the database cluster.

According to another embodiment, the query is directed to the metadata table stored in the database that stores the status of the node. In response to the query, the node returns the value stored in the node status field. For example, an application may be configured to query the metadata table stored in the database at regular intervals to obtain the status of the node. The regular interval may be a period of time, such as once every five minutes. Additionally, or alternatively, the interval may correspond to a defined number of queries or processing jobs. For example, the system may query the metadata table for the status of the node after every 90 queries. As another example, the system may query the metadata table for the status of the node after completing every job or task that involves generating queries. As another example, the system may query the metadata table for the status of the node prior to initiating a new job or task comprising multiple queries to the node.

In one or more embodiments, the node returns additional data associated with the node's interim status. For example, when a system changes a node's status from "up" to "draining", the system may designate an alternative node where the application can send subsequent queries. The currently-accessed node may return query results, the node's status identifier, and an identifier for the next node to an application in response to receiving a query to data stored in the currently-accessed node. In one embodiment, the node responding to an application's query request returns the node's status identifier and a value representing a time until the node will be inaccessible to the application in response to a query. For example, if a node is scheduled to be inaccessible in one minute, the node may return, together with query results, a value representing "one minute." The value representing the time may be a numerical value or a word or symbol representing a range of time. For example, a "priority 3" rating may indicate node shutdown within five minutes. A "priority 2" rating may indicate node shutdown within one minute. A "priority 1" rating may indicate node shutdown within twenty seconds. The application may use the value to determine a number of queries that it may request from the node prior to switching to an alternative node in the database cluster.

The system determines if the second node status change trigger has been detected (Operation 210). For example, in an embodiment in which a system detects a number of errors that exceeds a threshold, the second node status change trigger may be a period of time after detecting the number of errors exceeding the threshold. In an example in which a second node status change trigger is based on a scheduled node downtime, the second node status change trigger may be a determination that time for the scheduled shutdown has arrived. In an example in which the node shutdown trigger is based on receiving user input to change the node's status, the second node status change trigger may be a period of time from the time the user input the node status change.

For example, the system may present a user, such as a database administrator, with a graphical user interface (GUI). The user may interact with the GUI to change the status of nodes in the database cluster. When a user interacts with the GUI to change the status of a node from "up" to "down," the system may present the user with an option to place the node in an interim state, "draining," during which applications may query the node and receive notifications of the imminent "down" state of the node. Based on user confirmation, the system may change a value in a metadata table in the database for the node from "up" to "draining." The system may keep the node in the "draining" state for a defined period of time, such as ten minutes. During the ten minutes, as the node receives query requests, the node returns query results and node status information indicating the node is in a "draining" state. Once the ten minutes has elapsed, the system determines the second node status change condition has been met.

If the second node status change trigger has not been detected, the system determines if another query has been received (Operation 212). If the additional query is received, the system executes the query to return query results and returns the status identifier together with the query results (Operations 206 and 208). For example, an application may query a node and receive a response and status identifier that identifies the node status as an interim status prior to being inaccessible, such as "Draining." The application may determine that a presently-executing task includes a set of five additional queries to the database. The application may transmit the additional queries to the node, receive responses and status identifiers, and then switch over to query a different node in the database cluster.

If the system determines that the second node status change trigger has been detected, the system changes the node status from the pre-shutdown status to the inaccessible status (Operation 214). For example, the system may change a status identifier value stored in a metadata table in each node of the database cluster to identify the node as "down." In some examples, a node that is down is disconnected from the database cluster and does not perform any functions. In alternative examples, the node that is down performs some functions, but does not receive query requests from applications or return query responses. For example, the node may receive updates to an application running on the node or to an operating system running on the node. The node may receive an update to database data stored in the node, such as by replacing corrupted data in the node with uncorrupted data.

Based on changing the node's status, the system prevents the node from receiving additional queries (Operation 216). If an application transmits a query to the node subsequent to the node being designated as inaccessible, the application may receive an error message that the query could not be executed. The application may then query another node in the database cluster.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
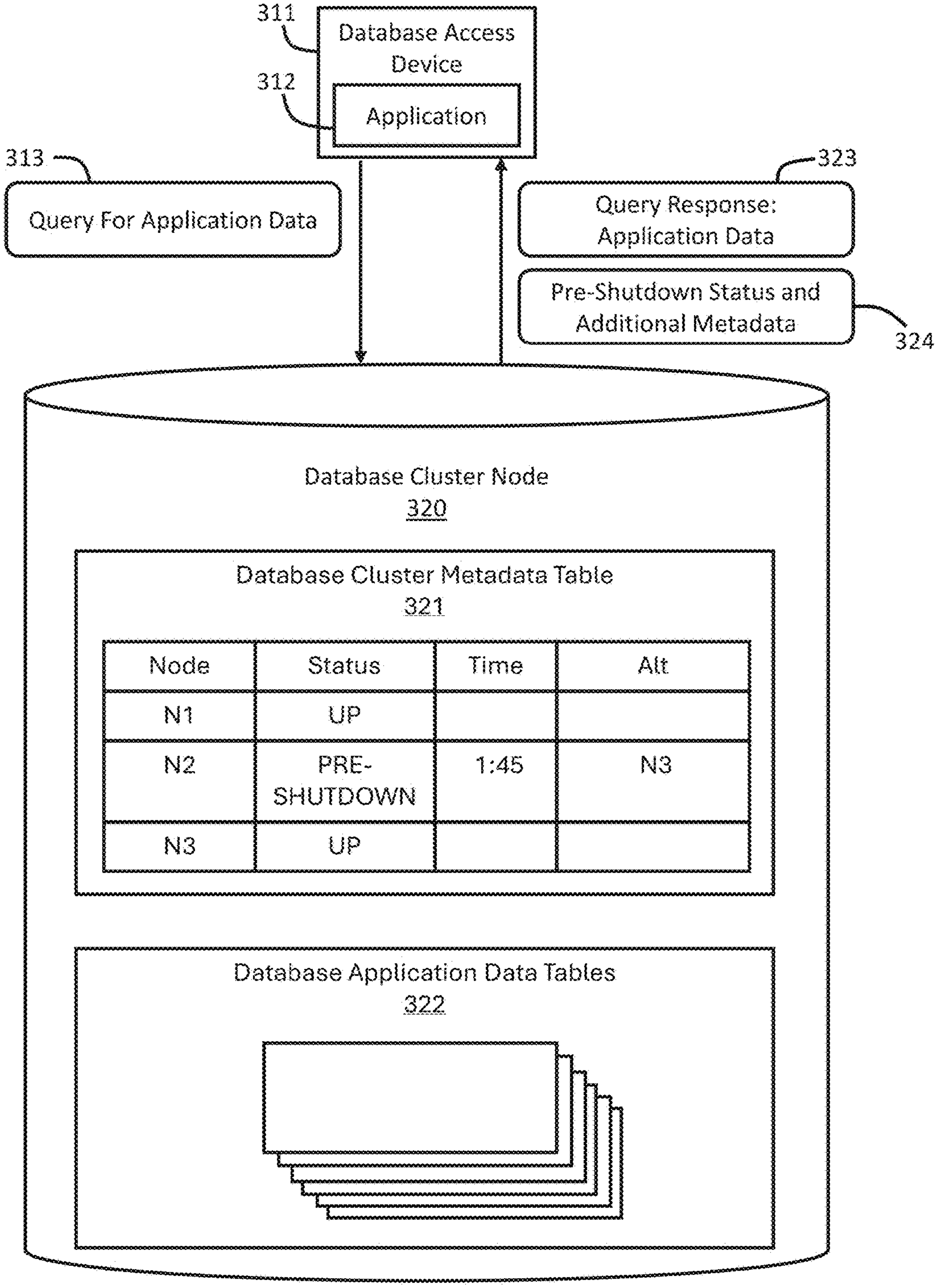
FIG. 3 illustrates an example embodiment.

FIG. 3 illustrates an example of a database system where a database cluster node responds to queries with cluster node status data.

A database access device 111 may be a personal computer, laptop, server, or any other device running an application 312 that accesses a database. The database is stored in a database cluster. The database cluster comprises multiple nodes. The nodes in the database cluster store replicated copies of the database. As applications access and modify the data stored in different nodes of the database cluster, the nodes synchronize to maintain a consistent copy of the database.

In the example illustrated in FIG. 3, the database is represented as database application data tables 322 stored in a database cluster node 320. The database cluster node 320 is one of multiple nodes in the database cluster. Only one node is illustrated in FIG. 3 for purposes of description. The database cluster node 320 is a database server. The database cluster node 320 receives queries from the application 312 running on the database access device 311. The database cluster node 320 executes the queries on the database application data tables 322 to return one or more records in response to the query.

In addition to the database application data tables 322, the database cluster node 320 stores a database cluster metadata table 321. The database cluster metadata table 321 stores values representing a node identifier (ID), a node status, a time until a node shutdown, and an alternative node. The alternative node represents a recommendation for where to direct subsequent queries. While the example illustrated in FIG. 3 presents a value "N3" for the alternative node, embodiments may present address data and connection data for communicating with the node N3.

When the database cluster node detects a status change condition, such as a particular data error condition, a scheduled shutdown, or a user input requesting a change from an operation "UP" state to an inaccessible "DOWN" state, the database cluster node 320 determines whether to place itself in an interim "PRE-SHUTDOWN" state. For example, the node 320 may determine that the change to a "DOWN" state is not an emergency to be implemented immediately. Based on determining the status may be changed to an interim state, the node 320 changes its status to "PRE-SHUTDOWN." In the embodiment of FIG. 3, the node 320 also sets a timer, such as three minutes, representing a duration that the node 320 will be in the pre-shutdown state prior to changing to an inaccessible state.

The node 320 also stores another node N3 in the database cluster to present as an alternative node for applications to access. While one node N3 is presented in FIG. 3 as an alternative node, in some embodiments, the node 320 may divide a recommendation among multiple nodes N1 and N3. For example, the node 320 may recommend one set of applications redirect queries to node N1 and another set of applications redirect queries to node N3.

Subsequent to storing its status as "PRE-SHUTDOWN," the database cluster node 320 receives a query 313 from application 312 to access data stored in the database application tables 322. In response to the query 313, the database cluster node 320 returns a set of application data as a query response 323. The database cluster node 320 also determines whether to send a warning message with the query response indicating its node status. Based on determining its status stored in the database cluster metadata table is "PRE-SHUTDOWN," the node 320 determines that it should transmit the status to the application 312 with the query response 323. Accordingly, the node 320 transmits (a) the pre-shutdown status, (b) the time remaining until node shutdown (e.g., "1:45"), and (c) the recommended alternative node ("N3").

Upon receiving the query response, pre-shutdown status data, and additional data, the application 312 determines whether to transmit further queries to the database cluster node 320. The application 312 determines that ten queries remain to complete a pending task. The application 312 compares query characteristics to a threshold to determine whether to transmit the queries to the node 320 or transmit the queries to another node, such as node N3, in the database cluster. The query characteristics may include, for example, an estimated time to complete the queries and an importance of the task, as determined by a priority metric. Based on determining the estimated time to complete the ten queries is less than the time until shutdown (e.g., "1:45"), the application 312 transmits the additional ten queries to the database cluster node 320. The database cluster node 320 returns the query results and notifications of its pre-shutdown status. Upon completing the ten additional queries, the application 312 begins a new task and transmits subsequent queries to node N3 in the database cluster. The pre-shutdown period elapses, and the database cluster node 320 is taken offline.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
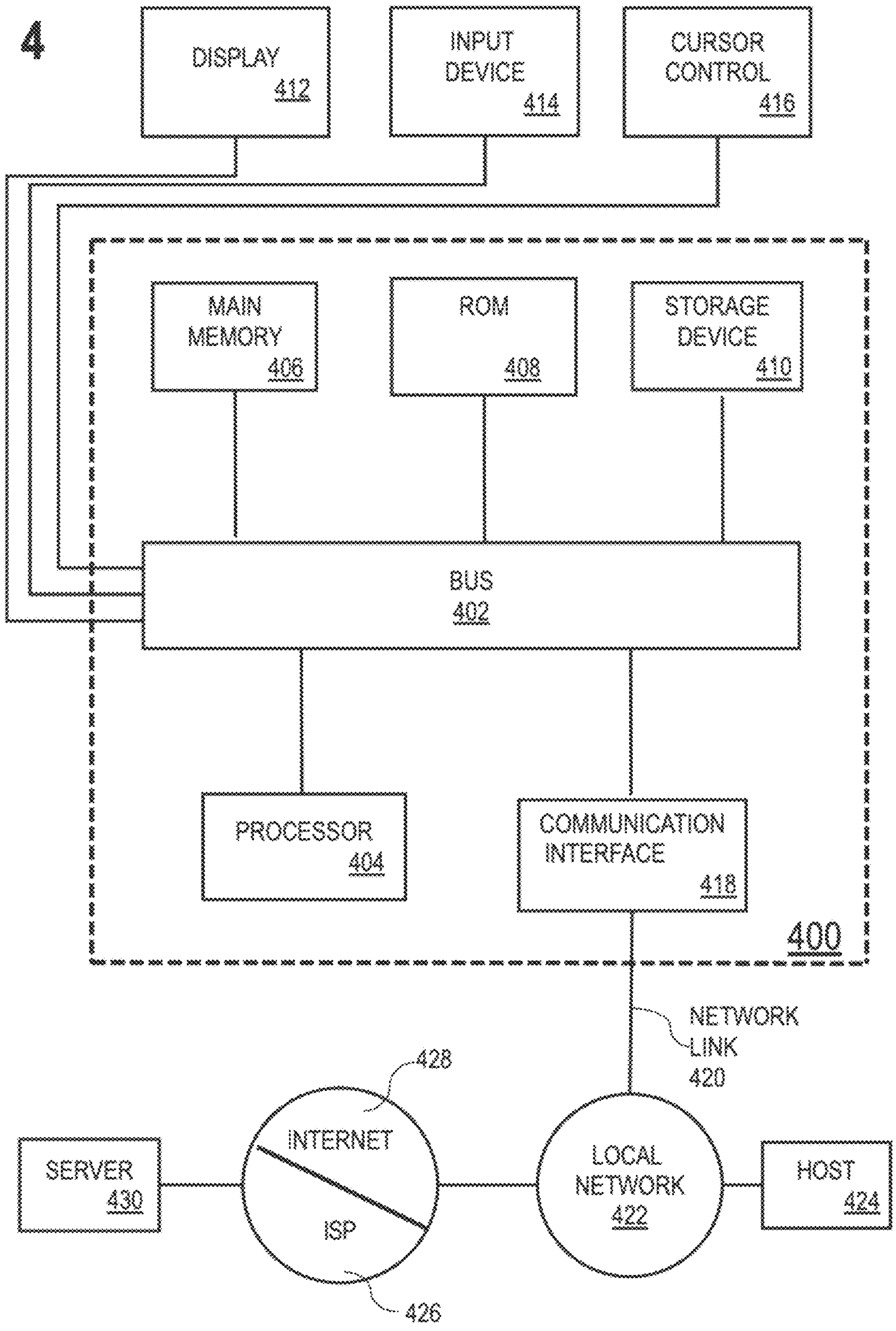
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid-State Drive (SSD) is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:

detecting a first trigger to change a state of a first node in a database cluster from an operational state to an inaccessible state at a future time, wherein the database cluster stores a database among a plurality of nodes in the database cluster, wherein the plurality of nodes includes the first node;

based on detecting the first trigger, modifying a status identifier for the first node from an operational status identifier to a pre-shutdown status identifier;

storing the pre-shutdown status identifier in a data table in the database;

subsequent to storing the pre-shutdown status identifier:

receiving, by the first node, a first query in a database language from an application accessing the database stored on the database cluster;

executing, by the first node, the first query to access a first set of data stored in the first node and specified in the first query; and in response to the first query, generating a first query response to the application including the pre-shutdown status identifier.

2. The non-transitory computer readable media of claim 1, wherein the first query is to a set of data stored in a first set of tables in the database, wherein the pre-shutdown status identifier is stored in a second table in the database, and wherein the response to the first query comprises: (a) query results from the first set of tables, and (b) the status identifier stored in the second table.

3. The non-transitory computer readable media of claim 1, wherein the first query is to a first table in the database, and wherein the first table stores the status identifier of the first node.

4. The non-transitory computer readable media of claim 1, wherein the response further includes a node identifier of a second node in the database cluster.

5. The non-transitory computer readable media of claim 4, wherein the operations further comprise:

responsive to receiving the response, directing, by the application, subsequent queries to the second node in the database cluster.

6. The non-transitory computer readable media of claim 1, wherein the operations further comprise:

subsequent to generating the response to the application, detecting, by the first node, a second trigger to change the state of the first node from a pre-shutdown state to the inaccessible state; and based on detecting the second trigger, changing the first node to the inaccessible state.

7. The non-transitory computer readable media of claim 6, wherein the operations further comprise:

subsequent to generating the first query response and prior to changing the first node to the inaccessible state, receiving, by the first node, a first set of queries from the application; and generating, by the first node, a first set of query responses to the first set of queries.

8. A method comprising:

detecting a first trigger to change a state of a first node in a database cluster from an operational state to an inaccessible state at a future time, wherein the database cluster stores a database among a plurality of nodes in the database cluster, wherein the plurality of nodes includes the first node;

based on detecting the first trigger, modifying a status identifier for the first node from an operational status identifier to a pre-shutdown status identifier;

storing the pre-shutdown status identifier in a data table in the database;

subsequent to storing the pre-shutdown status identifier:

receiving, by the first node, a first query in a database language from an application accessing the database stored on the database cluster;

executing, by the first node, the first query to access a first set of data stored in the first node and specified in the first query; and in response to the first query, generating a first query response to the application including the pre-shutdown status identifier, wherein the method is performed by at least one device including a hardware processor.

9. The method of claim 8, wherein the first query is to a set of data stored in a first set of tables in the database, wherein the pre-shutdown status identifier is stored in a second table in the database, and wherein the response to the first query comprises: (a) query results from the first set of tables, and (b) the status identifier stored in the second table.

10. The method of claim 8, wherein the first query is to a first table in the database, and wherein the first table stores the status identifier of the first node.

11. The method of claim 8, wherein the response further includes a node identifier of a second node in the database cluster.

12. The method of claim 11, further comprising:

responsive to receiving the response, directing, by the application, subsequent queries to the second node in the database cluster.

13. The method of claim 8, further comprising:

subsequent to generating the response to the application, detecting, by the first node, a second trigger to change the state of the first node from a pre-shutdown state to the inaccessible state; and based on detecting the second trigger, changing the first node to the inaccessible state.

14. The method of claim 8, further comprising:

subsequent to generating the first query response and prior to changing the first node to the inaccessible state, receiving, by the first node, a first set of queries from the application; and generating, by the first node, a first set of query responses to the first set of queries.

15. A system comprising:

at least one device including a hardware processor;

the system being configured to perform operations comprising:

detecting a first trigger to change a state of a first node in a database cluster from an operational state to an inaccessible state at a future time, wherein the database cluster stores a database among a plurality of nodes in the database cluster, wherein the plurality of nodes includes the first node;

based on detecting the first trigger, modifying a status identifier for the first node from an operational status identifier to a pre-shutdown status identifier;

storing the pre-shutdown status identifier in a data table in the database;

subsequent to storing the pre-shutdown status identifier:

receiving, by the first node, a first query in a database language from an application accessing the database stored on the database cluster;

executing, by the first node, the first query to access a first set of data stored in the first node and specified in the first query; and in response to the first query, generating a first query response to the application including the pre-shutdown status identifier.

16. The system of claim 15, wherein the first query is to a set of data stored in a first set of tables in the database, wherein the pre-shutdown status identifier is stored in a second table in the database, and wherein the response to the first query comprises: (a) query results from the first set of tables, and (b) the status identifier stored in the second table.

17. The system of claim 15, wherein the first query is to a first table in the database, and wherein the first table stores the status identifier of the first node.

18. The system of claim 15, wherein the response further includes a node identifier of a second node in the database cluster.

19. The system of claim 18, wherein the operations further comprise:

responsive to receiving the response, directing, by the application, subsequent queries to the second node in the database cluster.

20. The system of claim 15, wherein the operations further comprise:

subsequent to generating the response to the application, detecting, by the first node, a second trigger to change the state of the first node from a pre-shutdown state to the inaccessible state; and based on detecting the second trigger, changing the first node to the inaccessible state.

* * * * *